United States Patent
Mundra et al.

(10) Patent No.: US 8,828,547 B2
(45) Date of Patent: Sep. 9, 2014

(54) POLYURETHANE/POLYOLEFIN BLENDS WITH IMPROVED STRAIN AND SCRATCH WHITENING PERFORMANCE

(75) Inventors: Manish Mundra, Somerset, NJ (US); Geoffrey D. Brown, Bridgewater, NJ (US)

(73) Assignee: Union Carbide CHemicals & Plastics Technology LLC, Midland, MI (US)

( * ) Notice: Subject to any disclaimer, the term of this patent is extended or adjusted under 35 U.S.C. 154(b) by 2 days.

(21) Appl. No.: 13/699,966

(22) PCT Filed: May 24, 2011

(86) PCT No.: PCT/US2011/037648
§ 371 (c)(1),
(2), (4) Date: Nov. 26, 2012

(87) PCT Pub. No.: WO2011/159435
PCT Pub. Date: Dec. 22, 2011

(65) Prior Publication Data
US 2013/0081853 A1    Apr. 4, 2013

Related U.S. Application Data

(60) Provisional application No. 61/355,256, filed on Jun. 16, 2010.

(51) Int. Cl.
| | | |
|---|---|---|
| *B32B 27/00* | (2006.01) | |
| *C08K 3/02* | (2006.01) | |
| *C08K 5/34* | (2006.01) | |
| *C08K 3/32* | (2006.01) | |
| *C08K 5/51* | (2006.01) | |
| *H01B 7/295* | (2006.01) | |
| *H01B 3/30* | (2006.01) | |
| *C08G 18/42* | (2006.01) | |
| *C08G 18/66* | (2006.01) | |
| *C08L 75/04* | (2006.01) | |
| *H01B 3/44* | (2006.01) | |
| *C08G 18/32* | (2006.01) | |
| *C08L 23/08* | (2006.01) | |
| *C08L 85/02* | (2006.01) | |
| *C08K 5/52* | (2006.01) | |
| *C08K 5/54* | (2006.01) | |
| *C08K 5/523* | (2006.01) | |

(52) U.S. Cl.
CPC .............. *C08L 75/04* (2013.01); *C08L 2201/02* (2013.01); *H01B 7/295* (2013.01); *C08L 23/0853* (2013.01); *C08L 85/02* (2013.01); *C08K 5/5205* (2013.01); *H01B 3/308* (2013.01); *C08K 5/54* (2013.01); *C08G 18/4238* (2013.01); *C08K 5/523* (2013.01); *C08G 18/664* (2013.01); *C08K 2201/014* (2013.01); *H01B 3/44* (2013.01); *C08G 18/3206* (2013.01); *H01B 3/302* (2013.01)

USPC .......... 428/423.1; 524/80; 524/100; 524/135; 524/148; 524/416

(58) Field of Classification Search
None
See application file for complete search history.

(56) References Cited

U.S. PATENT DOCUMENTS

| 4,385,133 | A | 5/1983 | Alberino et al. |
|---|---|---|---|
| 4,522,975 | A | 6/1985 | O'Connor et al. |
| 4,857,600 | A | 8/1989 | Gross et al. |
| 5,167,899 | A | 12/1992 | Jezic |
| 5,246,783 | A | 9/1993 | Spenadel et al. |
| 5,272,236 | A | 12/1993 | Lai et al. |
| 5,278,272 | A | 1/1994 | Lai et al. |
| 5,575,965 | A | 11/1996 | Caronia et al. |
| 5,837,760 | A | 11/1998 | Hackl et al. |
| 5,986,028 | A | 11/1999 | Lai et al. |
| 6,496,629 | B2 | 12/2002 | Ma et al. |
| 6,582,819 | B2 | 6/2003 | McDaniel et al. |
| 6,632,527 | B1 | 10/2003 | McDaniel et al. |
| 6,714,707 | B2 | 3/2004 | Rossi et al. |
| 7,270,879 | B2 | 9/2007 | McCrary |
| 2002/0048676 | A1 | 4/2002 | McDaniel et al. |
| 2005/0019574 | A1 | 1/2005 | McCrary |
| 2005/0098916 | A1 | 5/2005 | Umetsu et al. |
| 2005/0107501 | A1 | 5/2005 | Yasuhiro |
| 2006/0151758 | A1 | 7/2006 | Reyes |
| 2007/0221890 | A1 | 9/2007 | Gan |
| 2008/0132615 | A1 | 6/2008 | Peerlings et al. |
| 2011/0130490 | A1* | 6/2011 | Brown et al. ................. 524/100 |
| 2012/0261163 | A1* | 10/2012 | Tai et al. ....................... 174/136 |

FOREIGN PATENT DOCUMENTS

| CN | 101153114 A | 4/2008 |
|---|---|---|
| CN | 101570632 A | 11/2009 |
| EP | 1466723 | 10/2004 |
| EP | 1719800 | 11/2006 |

(Continued)

OTHER PUBLICATIONS

International Search Report for PCT Application No. PCT/US2011/037648 mailed on Jul. 19, 2011.

*Primary Examiner* — Sheeba Ahmed
(74) *Attorney, Agent, or Firm* — Whyte Hirschboeck Dudek S.C.

(57) ABSTRACT

A composition, preferably a halogen-free, flame retardant composition, comprising in weight percent based on the weight of the composition:
  A. 1 to 90% TPU polymer,
  B. 1 to 90% polyolefin polymer, preferably a polar polyolefin polymer,
  C. 1 to 60% phosphorus-based, intumescent flame retardant,
  D. 0.5 to 25% liquid phosphate modifier, e.g., bis-phenol-A-polyphosphate, and
  E. Optional additives and/or fillers.

The compositions exhibit excellent strain and scratch whitening performance in combination with excellent burn performance, good flexibility and tensile properties, and good fabrication extrusion characteristics including improved surface smoothness.

12 Claims, No Drawings

(56) References Cited

FOREIGN PATENT DOCUMENTS

| | | |
|---|---|---|
| EP | 2311908 | 4/2011 |
| WO | 02060681 | 8/2002 |
| WO | 2004092254 | 10/2004 |
| WO | 2007031450 | 3/2007 |
| WO | 2010012136 | 2/2010 |
| WO | 2010148574 | 12/2010 |

\* cited by examiner

POLYURETHANE/POLYOLEFIN BLENDS WITH IMPROVED STRAIN AND SCRATCH WHITENING PERFORMANCE

CROSS REFERENCE TO RELATED APPLICATION

The present application is the national phase of PCT Patent Application No. PCT/US2011/037648 filed May 24, 2011, which claims the benefit of U.S. Ser. No. 61/355,256, filed Jun. 16, 2010. The entire content of which is incorporated by reference herein.

BACKGROUND OF THE INVENTION

1. Field of the Invention

This invention relates to thermoplastic polyurethane (TPU)/polyolefin (PO) blends. In one aspect the invention relates to such blends comprising a polyphosphate-type intumescent flame retardant while in another aspect, the invention relates to such blends further comprising a liquid phosphate modifier.

2. Description of the Related Art

Polyolefin polymers are widely used in the construction of wire and cable coverings, e.g., semiconductive shields, insulation layers, protective jackets, etc. due to their relatively low cost and good physical and chemical properties. Notwithstanding their generally good mechanical properties, better mechanical properties are desired and by replacing some of the polyolefin content with TPU, the mechanical properties are significantly improved, e.g., elongations greater than (>) 400% and tensile strengths >1200 psi versus 100% elongation and less than (<) 1000 psi tensile strengths with the polyolefin only. In addition, the compositions incorporating the TPU/polyolefin blend component show improved flexibility and higher deformation temperature, which are needed in certain wire and cable applications.

Also, the TPU/polyolefin blends show improved tape extrusion performance versus a comparable TPU-only composition, indicating improved melt rheology/fabrication capability for extrusion applications such as wire and cable use. By blending in low cost polyolefins with the TPU, the cost of the plastic is significantly reduced allowing new formulation latitude for both TPU and polyolefin end uses. The TPU/polyolefin blends have good utility as the base resin system for halogen-free, flame retardant formulations, particularly phosphorus-based, intumescent types.

However, halogen-free flame retardant compositions using the TPU/polyolefin base resins typically show poor strain whitening and scratch whitening performance. The challenge is to improve the strain and scratch whitening performance of these flame retardant compositions without any significant trade-offs in the overall performance balance.

SUMMARY OF THE INVENTION

The TPU/polyolefin blends of this invention exhibit excellent strain and scratch whitening performance in combination with an intumescent polyphosphate-type flame retardant by addition of 0.5 to 25 weight percent (wt %) liquid phosphate modifier such as bis-phenol-A-polyphosphate (BAPP), among others.

In one embodiment the invention is a composition comprising in weight percent based on the weight of the composition:
A. 1 to 90% TPU polymer,
B. 1 to 90% polyolefin polymer,
C. 1 to 60% intumescent phosphorus-type flame retardant,
D. 0.5 to 25% liquid phosphate modifier, and
E. Optional additives and/or fillers.

In one embodiment the composition is halogen-free. In one embodiment the TPU is at least one of polyether-based or polyester-based polyurethane. In one embodiment the polyolefin polymer is a polar polyolefin polymer.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Polyolefin", "olefin-based polymer" and like terms means a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"Halogen-free" and like terms mean that a composition is without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering.

"Ambient conditions" and like terms means a temperature of 23° C. and atmospheric pressure.

"Catalytic amount" means an amount of catalyst necessary to promote the crosslinking of an ethylene-vinylsilane polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

Thermoplastic Polyurethane (TPU)

The thermoplastic polyurethane used in the practice of this invention is the reaction product of a polyisocyanate (typically a di-isocyanate), one or more polymeric diol(s), and optionally one or more difunctional chain extender(s). "Thermoplastic" as here used describes a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One non-limiting example of a structural unit derived from a di-isocyanate (OCN—R—NCO) is represented by formula (I):

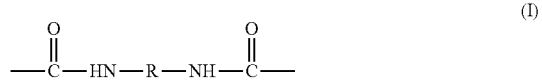

(I)

in which R is an alkylene, cycloalkylene, or arylene group. Representative examples of these di-isocyanates can be found in U.S. Pat. Nos. 4,385,133, 4,522,975 and 5,167,899. Nonlimiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinone bis-(hydroxyethyl)ether; cyclohexylene diols (1,4-, 1,3-, and 1,2-isomers), isopropylidene bis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment the TPU is at least one of polyether-based or polyester-based polyurethane. TPU compositions based on polyether-based polyurethane are preferred. In one embodiment the TPU has a shore A hardness of 70-95 as measured according to ASTM D-1238.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and commercial thermoplastic polyurethanes available from Bayer, Huntsman, the Lubrizol Corporation and Merquinsa.

The TPU typically comprises at least 1, more typically at least 20 and even more typically at least 30, wt % of the composition. The TPU typically comprises not more than 90, more typically not more than 70 and even more typically not more than 60, wt % of the composition.

Olefin Polymers

These thermoplastic polymers include both olefin homopolymers and interpolymers. Examples of olefin homopolymers are the homopolymers of ethylene and propylene. Examples of the olefin interpolymers are the ethylene/α-olefin interpolymers and the propylene/α-olefin interpolymers. The α-olefin is preferably a $C_{3-20}$ linear, branched or cyclic α-olefin (for the propylene and high olefin/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of olefin interpolymers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The olefin copolymers of this category of thermoplastic polymers also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Preferred olefin polymers for use in the practice of this invention are polar olefin polymers, i.e., olefin polymers containing one or more polar groups (sometimes referred to as polar functionalities). For purposes of this invention, a polar group is any group that imparts a bond dipole moment to an otherwise essentially nonpolar olefin molecule. Exemplary polar groups include carbonyls, carboxylic acid groups, carboxylic acid anhydride groups, carboxylic ester groups, vinyl ester groups, epoxy groups, sulfonyl groups, nitrile groups, amide groups, silane groups and the like, and these groups can be introduced into the olefin polymer either through grafting or copolymerization. Exemplary polar olefin polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, and maleic anhydride- or silane-grafted olefin polymers. Preferred polar olefin polymers include DuPont ELVAX ethylene vinyl acetate (EVA) resins, AMPLIFY ethylene ethyl acrylate (EEA) copolymer from The Dow Chemical Company, PRIMACOR ethylene/acrylic acid copolymers from The Dow Chemical Company, and SI-LINK poly(ethylene-co-vinyltrimethoxysilane) copolymer from The Dow Chemical Company.

Blends of one or more of the olefinic polymers, including all of the examples listed above, can also be used in this invention in combination with the thermoplastic polyester and polyurethane elastomer components.

The polyolefin polymer typically comprises at least 1, more typically at least 20 and even more typically at least 30, wt % of the composition. The polyolefin polymer typically comprises not more than 90, more typically not more than 70 and even more typically not more than 60, wt % of the composition.

Phosphorus-Based, Intumescent Flame Retardant

Good burn performance can be imparted to TPU/polyolefin blends by incorporation of phosphorus-based, intumescent-type flame retardant, preferably a halogen-free flame retardant (HFFR). These types of flame retardants typically include solid phosphorus fillers. The phosphorus-based intumescent flame retardant also typically includes one or more components contributing nitrogen either as a combined phosphorus-nitrogen species or as a separate component.

Nitrogen-based intumescent flame retardants used in the practice of this invention include, but are not limited to, phosphorus ester amides, phosphoric acid amides, phosphonic acid amides, phosphinic acid amides, and melamine and melamine derivatives, including melamine polyphosphate, melamine pyrophosphate and melamine cyanurate and mixtures of two or more of these materials.

Ammonium and piperazine polyphosphate and pyrophosphates are widely used, often in combination with flame retardant additives, such as melamine derivatives. In one embodiment the intumescent flame retardant used in the practice of this invention comprises AMFINE FP-2100J, a phosphorus-nitrogen based flame retardant mixture from Adeka Corporation. In one embodiment the intumescent flame retardant comprises BUDIT 3167, a phosphorus-nitrogen based flame retardant mixture from Budenheim Corporation. The FP-2100J and BUDIT 3167 typically provide good intumescent burn performance for polyolefin, TPU and other resin systems.

The phosphorus-based, intumescent flame retardant typically comprises at least 1, more typically at least 5 and even more typically at least 10, wt % of the composition. The polyolefin polymer typically comprises not more than 60, more typically not more than 55 and even more typically not more than 50, wt % of the composition.

The solid polyphosphate retardants such as ammonium polyphosphate or FP-2100J or BUDIT 3167 mixtures, typically incorporate some larger sized additive particles exceeding 5 micron particle diameter. The incorporation of these large particulate retardants into the TPU-polyolefin matrix greatly increases the tendency of these compositions to show undesired whitening when a fabricated article is scratched or strained. This can cause unacceptable end-use appearance disqualifying an otherwise acceptable material from commercial use. As such, a high commercial interest exists in identifying a means of reducing or eliminating this whitening behavior.

Liquid Phosphate Modifier

The incorporation of liquid phosphate modifiers into the TPU/polyolefin based compositions comprising a phosphorus-based, intumescent flame retardant greatly reduces strain or scratch whitening while providing overall synergistic property advantages. These liquid phosphate modifiers are different from and in addition to the phosphorus-based, intumescent flame retardant described above. These liquid phosphate modifiers have very good compatibility with the TPU/polyolefin resin system and have burn synergy with the phosphorus-based, intumescent flame retardants. As here used, "liquid phosphate modifier" means a phosphate flame retardant that is either a liquid at ambient conditions or is a low-melting solid at ambient conditions but with a melting temperature of less than 150° C. These modifiers include, but are not limited to, bis-phenol-A-polyphosphate (BAPP), resorcinol diphenyl phosphate (RDP), tricresyl phosphate (TCP), and mixtures of two or more of these compounds. Additional examples of the modifiers are shown in Table 1 below.

flame retardant which further benefits the whitening, flexibility and physical properties. This especially is an advantage for compositions where a combination of high burn resistance, good flexibility, and a good balance of tensile strength and elongation are required. There is also typically a substantial improvement to the surface smoothness of the fabricated article. Alternative approaches, such as the use of polyol modifiers as plasticizers, do not achieve the synergistic benefits of the current invention. When polyol modifiers are use, the lack of flame retardant contribution necessitates a higher loading of the solid phosphate flame retardant, with a substantial trade-off on both flexibility and tensile properties as compared to the preferred phosphate modifiers.

The liquid phosphate modifier typically comprises at least 7, more typically at least 10 and even more typically at least 12, wt % of the composition. The liquid phosphate modifier typically comprises not more than 25, more typically not more than 20 and even more typically not more than 15, wt % of the composition.

In one embodiment the liquid phosphate modifier is used in combination with one or more coupling agents or coupling agent assists such as a silane (either in free form or as a filler surface modifier) and/or functionalized polymer, e.g., maleic anhydride grafted EVA. Examples of preferred coupling agents or coupling agent assists are DuPont FUSABOND MC 250 (MAH-g-EVA) and Dow Corning Z-6020 silane (aminoethylaminopropyl trimethoxysilane plus methoxysilane). These additional coupling agents/assists are used in known ways and in known amounts to further enhance the

TABLE 1

Representative Liquid Phosphate Modifiers

| Product Name (Commercial) | Chemical Name | Appearance | Supplier |
| --- | --- | --- | --- |
| CR-733S | Phosphoric trichloride, polymer 1,3-benzenediol phenyl ester | Light yellow liquid with little odor | Daihachi Chemical Industry Company |
| CR-741 | Phosphoric Tri-chloride reaction production with Bis-A and Phenol | Clear colorless to light yellow liquid | Daihachi Chemical Industry Company |
| PHOSFLEX 362 | 2-ethylhexyl diphenyl phosphate | Oily liquid, clear, Odorless | Supresta |
| PHOSFLEX 4 | Tri-butyl Phosphate | Liquid, Colorless to pale yellow, Odorless | Supresta |
| TCP | Tricresyl Phosphate | Liquid, Colorless to light yellow, Little Odor | Daihachi Chemical Industry Company |
| TXP | Trixylene Phosphate (Mixed phosphate of xylenol, cresol, and Phenol | Liquid, Colorless to light yellow, Little Odor | Daihachi Chemical Industry Company |
| PX-200 | Oligomeric Aromatic Phosphate (Mostly RDP) | White powder and granule, no odor | Daihachi Chemical Industry Company |
| FYROL TEP | FYROL Triethyl Phosphate | Liquid Clear, Colorless, slight odor | Supresta |
| ADK STAB FP-700 | Aromatic Polyphosphate reaction mixture | Colorless, viscous liquid; Slight odor | Adeka |
| ADK STAB FP-600 | Aromatic Polyphosphate reaction mixture | Colorless, viscous liquid; Slight odor | Adeka |
| REOFOS® RDP | Phosphoric trichloride, polymer with 1,3-benzenediol, phenyl ester + Triphenyl phosphate | Clear, pale yellow liquid, Slight odor | Chemtura |
| FYROFLEX BDP | Bisphenol A bis(diphenyl phosphate) + Triphenyl phosphate | Colorless to pale yellow liquid; Slight odor | Supresta |

In addition to the improvement in scratch whitening, the liquid phosphate modifiers provide synergistic benefits. There is an improvement to the material flexibility and fabrication extrusion via a plasticizing mechanism and the reduction in melt viscosity, while the phosphorus content contributes to flame retardant functionality. This burn contribution allows a corresponding reduction in the particulate whitening performance and/or physical properties in combination with the phosphate modifiers.

Additives and Filled

The compositions of this invention may also contain additives and/or fillers. Representative additives include but are not limited to antioxidants, curing agents, cross linking co-agents, boosters and retardants, processing aids, coupling agents (in addition to the liquid phosphate coupling agents), colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used a conventional manner and in conventional amounts, e.g., from 0.01 wt % or less to 10 wt % or more based on the weight of the composition.

Representative fillers include but are not limited to the various carbon blacks, metal hydroxides, e.g., magnesium hydroxide, potassium hydroxide and aluminum trihydroxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorillonite; huntite; celite; asbestos; ground minerals; and lithopone. These fillers are typically used a conventional manner and in conventional amounts, e.g., from 5 wt % or less to 50 wt % or more based on the weight of the composition.

Representative examples of carbon blacks include ASTM grade N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 14 g/kg and average pore volumes ranging from 10 to 150 cm3/100 g. Generally, smaller particle sized carbon blacks are employed, to the extent cost considerations permit. The carbon black can be included in the polymer composition in the range of 1 to 5 wt % and preferably 2 to 3 wt % to provide good UV weathering performance. One preferred carbon black for use in wire and cable jacketing compounds to achieve good weathering performance is N110-type carbon black.

Suitable UV light stabilizers include hindered amine light stabilizers (HALS) and UV light absorber additives. Representative HALS that can be used in the compositions include, but are not limited to, TINUVIN XT 850, TINUVIN 622, TINUVIN® 770, TINUVIN® 144, SANDUVOR® PR-31 and CHIMASSORB® 119 FL. TINUVIN® 770 is bis-(2,2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. CHIMASSORB® 119 FL or CHIMASSORB® 119 is 10 wt % of Dimethyl succinate polymer with 4-hydroxy-2,2,6,6, -tetramethyl-1-piperidineethanol and 90 wt % of N,N'''[1,2-Ethanediylbis[[[4,6-bis[butyl(1,2,2,6,6-pentamethyl-4-piperidinyl)amino]-1,3,5-traizin-2-yl]imino]-3,1-propane-diyl]]bis[N'N''-dibutyl-N'N''-bis(1,2,2,6,6-pentamethyl-4-piperidinyl)]-1, is commercially available from Ciba, Inc. Representative UV absorber (UVA) additives include benzotriazole types such as TINUVIN® 326 and TINUVIN® 328 commercially available from Ciba, Inc. Blends of HAL and UVA additives are also effective.

In some embodiments, the light stabilizers are present in amounts of 0.1 to 5.0 weight percent, based on the total weight of the compositions. For example, embodiments of the present composition can include 0.25 to 3.0 weight percent light stabilizer. For the purposes of this disclosure these light stabilizer ranges do not include the $TiO_2$, although it can act as a light stabilizer in the compositions.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine antidegradants or stabilizers. Antioxidants can be used in amounts of 0.1 to 5 wt % based on the weight of the composition.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes. Processing aids can be used in amounts of 0.05 to 5 wt % based on the weight of the composition.

Compositions

The compositions of this invention are thermoplastic, i.e., are capable of being repeatedly melted by increasing temperature and solidified by decreasing temperature. Thermoplastic materials are those materials the change of which upon heating is substantially physical rather than chemical. They are largely two- or one-dimensional molecule structures. Moreover, the compositions of this invention are flame retardant and preferably halogen-free.

The compositions of this invention can also comprise relatively minor amounts of other polymers, e.g., less than 10, preferably less than 8 and more preferably less than 6, wt % of the composition. Exemplary other polymers include polyethers, polyamides, polycarbonates and the like. These polymer components can be incorporated to further enhance the overall property balance of the composition by contributing to burn performance, mechanical toughness, flexibility, or other key properties.

Compounding

Compounding of the compositions can be effected by standard equipment known to those skilled in the art. Examples of compounding equipment are internal batch mixers, such as a BANBURY™ or BOLLING™ internal mixer. Alternatively, continuous single, or twin screw, mixers can be used, such as FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

A cable containing an insulation layer comprising a composition of this invention can be prepared with various types of extruders, e.g., single or twin screw types and should have extrusion capability on any equipment suitable for thermoplastic polymer extrusion. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric compound feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure. The compositions outlined in this disclosure can typically be processed on any fabrication equipment that is suitable for extruding wire and cable compositions.

Another aspect of the invention provides an article. This includes a component comprising the present composition. In particular, the article includes a component composed of a composition as described above.

In some embodiments, the article includes a metal conductor and a coating on this metal conductor to provide an "insulated" wire capable of electrical transmission of low voltage telecommunication signals or for a wide range of electrical power transmission applications. A "metal conductor," as used herein, is at least one metal component used to transmit either electrical power and/or electrical signals. Flexibility of wire and cables is often desired, so the metal conductor can have either a solid cross-section or preferentially can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to cable "jacketing". For some cables, the sheathing is only a polymeric jacketing layer surrounding a cable core. And there are also some cables having a single layer of polymer surrounding the conductors, performing both the roles of insulation and jacketing. The compositions can be used as any of the polymeric components in the full range of wire and cable products, including power cables and both metallic and fiber optic communication applications. The composition may be any composition as disclosed herein. As here used, "on" includes direct contact or indirect contact between the coating and the metal conductor. "Direct contact" is a configuration in which the coating immediately contacts the metal conductor, with no intervening layer(s) and/or no intervening material(s) located between the coating and the metal conductor. "Indirect contact" is a configuration whereby an intervening layer(s) and/or an intervening material(s) is located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In another embodiment, the compositions can be used as a layer or component in fiber optic cables which incorporate optical fibers transmitting light energy. These cables are typically used in communication applications, and are capable of transmitting large quantities of data. For optic cable jacketing, the polymeric coating provides many of the same protective benefits as metallic based cables, providing a tough protective layer with good cosmetic appearance, and having any required level of burn resistance. For fiber optic cables, the electrical characteristics of the coating material may be less important.

In an embodiment, the article is a coated metal conductor. Nonlimiting examples of suitable coated metal conductors include flexible wiring such as flexible wiring for consumer electronics, a power cable, a power charger wire for cell phones and/or computers, computer data cords, power cords, appliance wiring material, and consumer electronic accessory cords.

The following examples illustrate various embodiments of this invention. All parts and percentages are by weight unless otherwise indicated.

SPECIFIC EMBODIMENTS

Experimental Protocol

Melt Mixing/Melt Compounding

The resin batches are prepared using a BRABENDER™ model PREP MIXER® laboratory electric batch mixer equipped with cam blades. The PREP MIXER® is C.W. Brabender's largest mixer/measuring head that is a 3-piece design consisting of two heating zones with a capacity of 350/420 ml depending on mixer blade configuration. The net chamber volume with the cam blades inserted is 420 ml and batch size is corrected for composition density to provide proper fill of the mixing bowl using the following calculation:

$$\text{Batch Weight} = \text{Calculated } SG * 316.5$$

This corresponds to about a 75% fill factor to provide good mixing action. For the compositions in this study, this provided batch sizes in the range of about 360 to 400 grams (g). The cam blades are designed as a medium shear-rate blade imposing a combination of milling, mixing, and shearing forces against the test sample, alternating compacting and releasing the material within the chamber. For this particular mixer, the gear offset is a 3:2 drive blade to driven blade gear ratio (for every three rotations of the drive blade, there are two rotations of the driven blade). The difference between the two blades is the drive blade is powered directly by the drive motor and the driven blade rotates on the gearing built into the mixing bowl.

Each mixing trial begins by first adding the base resins into the mixing bowl while the blades are rotating at 15 revolutions per minute (rpm). The process temperature set point for both zones is 170° C. or 180° C. depending on the melt temperature of the compound. The rotor speed is then increased to 40 rpm until full fluxing is reached. The mixing speed is reduced to 20 rpm to add the rest of the formulation ingredients, which includes the antioxidants and other liquid components. Once all the additives are loaded, the ram arm closure assembly is lowered and the mixing speed is increased to 40 rpm. The duration of the mixing cycle is 3 minutes. Once the mixing trial is completed, the molten material is backed out of the mixer using tweezers and collected. The molten material is then placed between two sheets of MYLAR® polyester sheet and compression molded at room temperature into a flat pancake. The mixer is disassembled and cleaned using copper utensils and brass brushes. The cooled sample is later cut into small squares and strips for plaque preparation and granulation using a #3 Armature Greenard Arbor press and a large cutting knife. The mixer is disassembled and cleaned using copper and brass utensils and brushes.

Plaque Preparation

Samples are compression molded using a Greenard HYDROLAIR™ steam press (with quench cooling capability) operated in the manual mode. One 8×8×75 mil plaque for each sample is prepared. The press is preheated to 180° C. (±5° C.). Eighty-five grams of material are pre-weighed and placed in the center of a 50 mil stainless steel plaque between the mold assembly made up of mold release treated MYLAR film and aluminum sheets. The filled mold is then placed into the press at 500 pounds per square inch (psi) for three minutes, and then the pressure is increased to 2,200 psi for an additional 3 minutes. Steam/water switching occurs 15 seconds prior to the 3 minute mark and the sample is quench-cooled for 5 minutes at the high pressure setting.

Granulation

Samples are granulated using a Thomas Whiley ED Model 4 knife mill. The mill consists of a grinding chamber that has four stationary blades and a rotor with four adjustable blades that operates edge against edge with the stationery blades for grinding the material. The gap sizes between the stationery blade and the cutting blade are adjustable, and are set to 0.030 inch for these trials. A product receiver lies at the base of the instrument and collects the reduced particles. A screen prevents large chunks of material from exiting the grinding chamber and only allows the ground material of correct particle size to fall through the screen into the product receiver. A 6 mm screen is used. The coarse material remains in the chamber for additional grinding until it is small enough to pass through the screen. The operating speed of the rotating head is set at 1,200 rpm which is the maximum speed for this model. The granulated material is then collected and used for extrusion or plaque preparation.

Material Drying

Before lab extrusion or other specimen preparation, the granulated material is vacuum dried for at least 6 hours at 85° C. under high vacuum (<2.0 inches of Hg). This removes free moisture that might cause porosity or material degradation. After drying, the material is placed in a closed foil bag and allowed to cool to room temperature prior to the lab extrusion work.

Brabender Tape Extruder

A 3 barrel zone, 25:1 L/D, ¾" BRABENDER extruder with 1"×0.020" "coat hanger slit" type tape die is used with a 3:1 compression ratio metering screw. No breaker plate or screen pack is used. A Teflon-coated conveyor belt of about 1 meter (m) bed length capable of running approximately 1 m/min is used. The zone temperatures are set at 170° C., 175° C., 180° C. and 180° C. from feed throat to die, respectively.

Vacuum dried samples are extruded with a screw speed starting at 20 rpm. Tape samples are collected on the moving conveyor belt. Screw speed and conveyor belt speed are adjusted to obtain tape thickness of approx. 0.018". Approximately 6 meters of tape samples are collected for further testing and evaluation.

Tensile Testing

Extruded tape is typically used to prepare the tensile test specimen. The tape samples is first conditioned for 40 hours in a controlled environment at 73.4° F. (+/−3.6 F) with 50% (+/−5%) relative humidity (RH). After conditioning, specimens are cut using an arbor press and an ASTM-D638 Type IV tensile bar die (providing 4.5" overall dog-bone specimen length with a 0.250' wide test zone).

The tensile testing is conducted on INSTRON RENEW™ 4201 65/16 and 4202 65/16 apparatus using a special 2-speed protocol to provide secant modulus followed by tensile and elongation @ break measurements. A time based displacement method is used to determine the secant modulus strain levels to eliminate prior difficulties with extensometer slippage and poor resolution at the low extension levels used for the modulus test. For the ASTM Type IV dog-bone, strain is assumed to occur over a 2.0" effective length (50 mm). Therefore, a 1% strain increment corresponds to a 0.50 mm jaw movement. At 50 mm/min test speed, this strain level equals 0.01 minutes=0.6 seconds. To eliminate "start-up" noise and pre-tension in the specimen, secant modulus is calculated with a "starting load" at 0.4 seconds, with 1% load measurements at 1 second, 2% load at 1.6 seconds, and 5% load at 3.4 seconds. The 1% secant load equals the 1 second load minus the 0.4 second load; the 2% secant load equals the 1.6 second load minus the 0.4 second load, and so forth. This load is then used in the standard secant modulus calculation; e.g., 2% secant modulus=(2% secant load) measured specimen cross-sectional area). At 18 seconds (30% elongation), the testing speed automatically increases to 500 mm/min then efficiently completes the tensile test to the break portion of the testing. Standard deviation for 5 repeat specimens on 1% secant modulus is usually less then 5% of the average value using the time-based strain method. The INSTRON program for this testing is based on the 2.0" effective strain length (Type IV dog-bone), so all values are calculated automatically for each test run.

Mini-Wire Line

A 3 barrel zone, 25:1 L/D, ¾" BRABENDER extruder with a 0.05 inch tip and a 0.08 die is used with a 3:1 compression ratio metering screw. No breaker plate or screen pack is used. The bare copper conductor is 18 AWG/41 strands with nominal diameter of 0.046 inches. The zone temperatures are set at 180° C. for all zones including the die. Wire coated samples are immediately cooled in a water trough that resides 4-inches from the die.

Vacuum-dried samples are extruded with a screw speed ranging between 25-30 rpm. Wire-coated samples are collected on a moving conveyor belt. The conveyor belt speed is set at 15 feet per minute. Screw speed is adjusted to obtain target diameter of 0.085 inches which gives a wire coating thickness of approximately 0.020 inches or 20 mils. A minimum of 60 feet of wire coated samples are collected of each sample for further testing and evaluation.

Tensile Strain Whitening

Three-inch long tape specimens are pulled on RENEW™ 4201 65/16 model for tensile strain whitening comparison. The specimens are pulled to 300% elongation at a speed of 20 inches/minute strain rate. A contact mode extensometer is used during the test to measure strain accurately. Visual inspection is used to rate the tapes against the control sample. At least two different people inspect the samples and then the analyses are combined together. Ratings from 1 to 10 are given. A higher rating equates to reduced whitening or better whitening performance.

Texas A&M Scratch Tester

The scratch resistance test is performed using the Texas A&M scratch testing instrument. Test sample are adhered to a steel plate using double-sided tape prior to scratching. In order to enhance the differences between the samples, a modified ASTM standard D7027-05 test protocol is used. The testing parameters utilized for this study are: scratch speed of 100 mm/s, scratch length of 50 mm, linear increasing load 1-10 N, and a data collection rate of 1000 points/s.

Digital images of the scratches are obtained using an EPSON PERFECTION® 4990 Photo flatbed scanner. Samples are scanned in under the gray scale setting at a resolution of 2400 dpi, with no image alterations. During scratching, the normal and tangential loads are recorded simultaneously and correlated with scratch images later. Each sample is scratched to make three reproducible scratches, with reproducibility of the scratches being defined as having the same initial and final loads and maintaining visual similarity by the naked eye. One representative scratch for each sample is analyzed for the purpose of comparing samples.

Table 2 provides a description of the materials used in the examples reported below:

TABLE 2

Materials Used in the Examples

| Raw Materials | Description | Intended Use |
|---|---|---|
| DOW TPU 2355-75 A | Polyurethane from methylene diphenyl diisocyanate, 1,4-butanediol and adipate polyol made from 1,4-butanediol and adipic acid | Base resin |
| DOW TPU 2355-80 A | Polyurethane from methylene diphenyl diisocyanate, 1,4-butanediol and adipate polyol made from 1,4-butanediol and adipic acid | Base Resin |
| ELVAX 40L-03 (40% VA, 3MI) | Ethylene/vinyl acetate copolymer | Secondary resin/Coupling agent |
| ELVAX 265 (28% VA/, 3 MI) | Ethylene/vinyl acetate copolymer | Secondary resin/Coupling agent |
| DOW CORNING Z-6020(R) SILANE | Aminoethylaminopropyl-trimethoxysilane + Methoxysilane | Coupling agent |
| T-1166 FM/ACM AMFINE FP-2100 (Untreated) | Mixture of Ammonium Polyphosphate, Piperazine Polyphosphate, and Melamine Pyrophosphate (No surface treatment) | Intumescent Flame Retardant Filler |
| AMFINE FP-2200 | Mixture of Ammonium Polyphosphate, Piperazine Polyphosphate, and Melamine Pyrophosphate (No surface treatment) | Intumescent Flame Retardant Filler |
| REOFOS BAPP | Bis-phenol A diphosphate (Phosphoric trichloride, reaction product with bisphenol A and phenol + Triphenyl phosphate) | Flame retardant filler (liquid) |
| DQNA-0013, carbon black MB | Ethylene vinyl acetate carbon black (40%) masterbatch | UV stabilizer/FR synergist |
| CIBA IRGAFOS 168 | Tris (2,4-di-tert-butylphenyl) phosphite | Antioxidant |
| CIBA IRGANOX 1010 | Tetrakis(methylene(3,5-di-t-butyl-4-hydroxy hydrocinnamate)) methane | Antioxidant |

Table 3 reports the compositions of Inventive Examples 1-3 and Table 4 reports the tensile and elongation testing results performed on these compositions.

TABLE 3

Composition of the Comparative Example and Inventive Examples 1-3

|  | Comp. Ex. | Inv. Ex 1 | Inv. Ex. 2 | Inv. Ex. 3 |
|---|---|---|---|---|
| Dow TPU 2355-80AE | 36.71 | 40.55 | 39.70 | 39.70 |
| Elvax40L-03 (40% VA, 3 MI) | 9.67 | 7.16 | 7.01 | 7.01 |
| Elvax 265 (28% VA/,3 MI) | 6.32 | 0.00 | 0.00 | 0.00 |
| DQNA-001 3, carbon black MB | 1.00 | 1.00 | 1.00 | 1.00 |
| Reofos BAPP | 0.00 | 10.00 | 12.50 | 15.00 |
| Amfine FP-2200 | 46.00 | 41.00 | 39.50 | 37.00 |
| Irgafox 168 | 0.10 | 0.10 | 0.10 | 0.10 |
| Irganox 1010 | 0.20 | 0.20 | 0.20 | 0.20 |

TABLE 4

Tensile and Elongation Test Results of the Comparative Example and Inventive Examples 1-3

|  | Comp. Ex. | Inv. Ex 1 | Inv. Ex. 2 | Inv. Ex. 3 |
|---|---|---|---|---|
| Yield Strength (psi) | 1074 | 1283 | 1239 | 1292 |
| Tensile Strength @ Peak (psi) | 1440 | 1283 | 1257 | 1292 |
| Elongation @ Break (%) | 454 | 326 | 276 | 333 |
| 1% Secant Modulus (psi) | 7800 | 6395 | 6180 | 4996 |
| 2% Secant Modulus (psi) | 7390 | 5997 | 5827 | 4708 |
| 5% Secant Modulus (psi) | 6321 | 5198 | 5028 | 4116 |
| Lab Extruder(psi) | 5150 | 3150 | 3300 | 2530 |
| Strain whitening (10 Best) | 5 | 7 | 8 | 9 |

Table 5 reports the compositions of the Comparative Example and Inventive Example 4, and Table 6 reports the tensile and elongation testing results performed on these compositions.

TABLE 5

Composition of Inventive Examples 4 and 5

|  | Inventive Ex. 4 | Inventive Ex. 5 |
|---|---|---|
| Dow TPU 2355-75A | 41.40 | 40.55 |
| Elvax40L-03 (40% VA, 3 MI) | 7.31 | 7.16 |
| BAPP | 10.00 | 10.00 |
| DOW CORNING Z-6020(R) SILANE |  | 1.00 |
| T-1166 FM/ACM Amfine FP-2100 (Untreated) | 40.00 | 40.00 |
| MB0013 Carbon Black | 1.00 | 1.00 |
| Irgafox 168 | 0.10 | 0.10 |
| Irganox 1010 | 0.20 | 0.20 |

TABLE 6

Tensile and Elongation Test Results of Inventive Examples 4 and 5

|  | Inventive Ex. 4 | Inventive Ex 5 |
| --- | --- | --- |
| Yield Strength (psi) | 656 | 871 |
| Tensile Strength @ Peak (psi) | 1863 | 871 |
| Elongation @ Break (%) | 541 | 178 |
| 1% Secant Modulus (psi) | 4519 | 4489 |
| 2% Secant Modulus (psi) | 4230 | 4180 |
| 5% Secant Modulus | 3664 | 3598 |
| Strain Whitening Rating (10 Best) | 6 | 9 |
| Scratch Whitening Ratings (10 Best) | 5 | 9 |
| Tape Extrusion Runs |  |  |
| Head Pressure | 3900 | 1130 |
| Extruder Amps | 3.2 | 2 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A composition comprising in weight percent based on the weight of the composition:
   A. 1 to 90% TPU polymer,
   B. 1 to 90% polyolefin polymer,
   C. 1 to 60% phosphorus-based, intumescent flame retardant,
   D. 0.5 to 25% liquid phosphate modifier,
   E. a silane, and
   F. Optional additives and/or fillers.

2. The composition of claim 1 in which the TPU polymer is at least one of polyether-based or polyester-based polyurethane.

3. The composition of claim 2 in which the polyolefin polymer is a polar polymer.

4. The composition of claim 3 in which the polar polymer is at least one of ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, and maleic anhydride- or silane-grafted olefin polymers.

5. The composition of claim 4 in which the phosphorus-based, intumescent flame retardant comprises a nitrogen contributing component.

6. The composition of claim 1 in which the liquid phosphate modifier is at least one of bis-phenol-A-polyphosphate (BAPP), resorcinol diphenyl phosphate (RDP), tricresyl phosphate (TCP).

7. The composition of claim 1 further comprising a functionalized polymer.

8. The composition of claim 7 in which the functionalized polymer is a MAH-g-EVA.

9. The composition of claim 1 further comprising carbon black.

10. An article comprising the composition of claim 1.

11. The article of claim 10 in the form of a wire or cable.

12. The article of claim 11 in which the wire or cable comprises a layer of the composition of claim 1.

* * * * *